Nov. 13, 1951 J. H. VOSS 2,574,943

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 1

INVENTOR.
JOHN H. VOSS

BY
Chas. W. Candy
ATTORNEY

INVENTOR.
JOHN H. VOSS
BY
Chas. W. Candy
ATTORNEY

Nov. 13, 1951 J. H. VOSS 2,574,943

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 3

INVENTOR.
JOHN H. VOSS
BY
Chas. W. Candy
ATTORNEY

Nov. 13, 1951 J. H. VOSS 2,574,943

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 4

INVENTOR.
JOHN H. VOSS

BY

ATTORNEY

Nov. 13, 1951 J. H. VOSS 2,574,943

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 5

INVENTOR.
JOHN H. VOSS

BY Chas. Mc. Candy

ATTORNEY

Nov. 13, 1951 J. H. VOSS 2,574,943

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 6

INVENTOR.
JOHN H. VOSS

BY [signature]

ATTORNEY

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 7

INVENTOR.
JOHN H. VOSS
BY
[signature]
ATTORNEY

ALL RELAY PRIVATE AUTOMATIC TELEPHONE SYSTEM HAVING CONNECTIONS TO ONE AND TWO DIGIT TRUNKS

Filed Aug. 2, 1947 8 Sheets-Sheet 8

INVENTOR.
JOHN H. VOSS
BY
[signature]
ATTORNEY

Patented Nov. 13, 1951 2,574,943

UNITED STATES PATENT OFFICE 2,574,943

ALL RELAY PRIVATE AUTOMATIC TELEPHONE SYSTEM HAVING CONNECTIONS TO ONE AND TWO DIGIT TRUNKS

John H. Voss, Rochester, N. Y., assignor to Automatic Electric Laboratories, Inc., Chicago, Ill., a corporation of Delaware Application August 2, 1947, Serial No. 765,684

16 Claims. (Cl. 179—18)

The present invention relates in general to automatic telephone systems, and more particularly to improvements in automatic switching apparatus adapted for use in all-relay private automatic exchanges.

The principal object of the invention is to provide an improved arrangement of a local link connector and a two-way trunking service for automatically extending all calls.

A more specific object of the invention is to provide local intercommunicating service, one digit trunk hunting service for automatically selecting an idle central office trunk and two digit trunk hunting service for common-battery manual boards.

A feature of the invention is an arrangement for "holding" a trunk call while making a local call or another trunk call.

Another feature relates to the means for automatically disconnecting the connector from the trunk just placed in holding position so that the connector may be reused to connect with another line or trunk, without releasing the connection from the calling line and the connector.

Further features of the invention pertain to the particular arrangement of the circuit elements, whereby, the above and additional operating features are attained.

The novel features believed to be characteristic of the invention are set forth with particularity in the appended claims. The invention, both as to its organization and method of operation together with further objects and advantages, thereof, will best be understood by reference to the specification taken in connection with the accompanying drawings, in which:

The circuit diagrams when laid out in accordance with the plan shown in Figure 9 illustrate the equipment as necessary to show the invention.

*General description*

Figure 1:
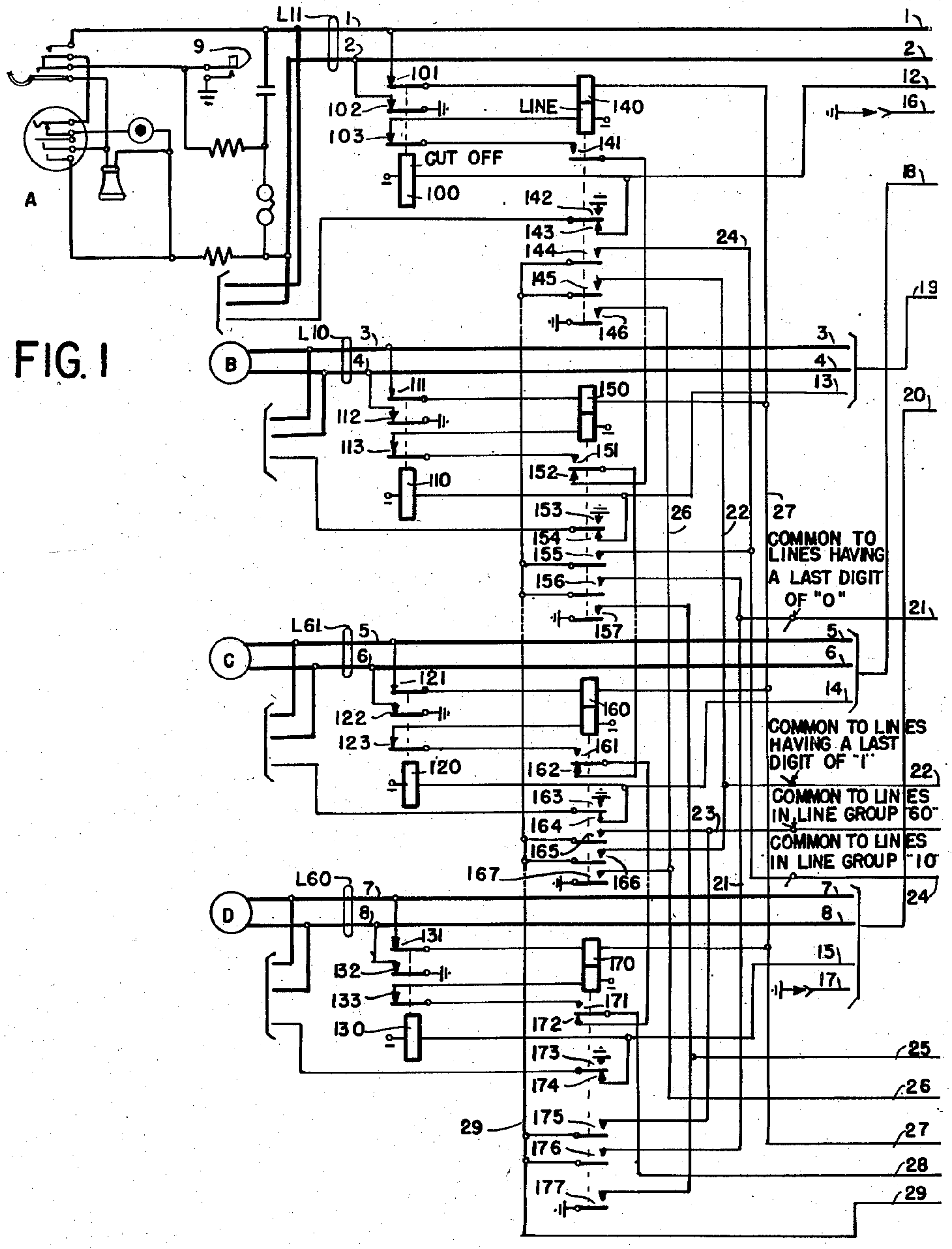
Figure 1 shows subscribers' stations such as A, B, C and D connected to lines L11, L10, L61 and L60 respectively. It shows a station's equipment such as A, more in detail, and also shows the individual line equipment.

Referring to Figure 1, the reference characters A, B, C and D indicate subscriber's stations, with the equipment of station A being shown in detail. The telephone at station A is connected with the system over line 11 comprising conductors 1 and 2. The line equipment individual to each station comprises line relays such as 140, 150, 160 and 170, and cut-off relays 100, 110, 120 and 130 respectively. The coils of the line relays contain two windings, one providing their operating circuit and the other providing their holding circuit. The holding circuit for the line relays is a chain circuit through contacts of all the other line relays and is so designed that a line relay can lock operated only if no other line relays are operated. Fourth conductors such as 16 and 17 are provided through the linefinder to the associated connector to supply special or restricted service.

Figure 2:
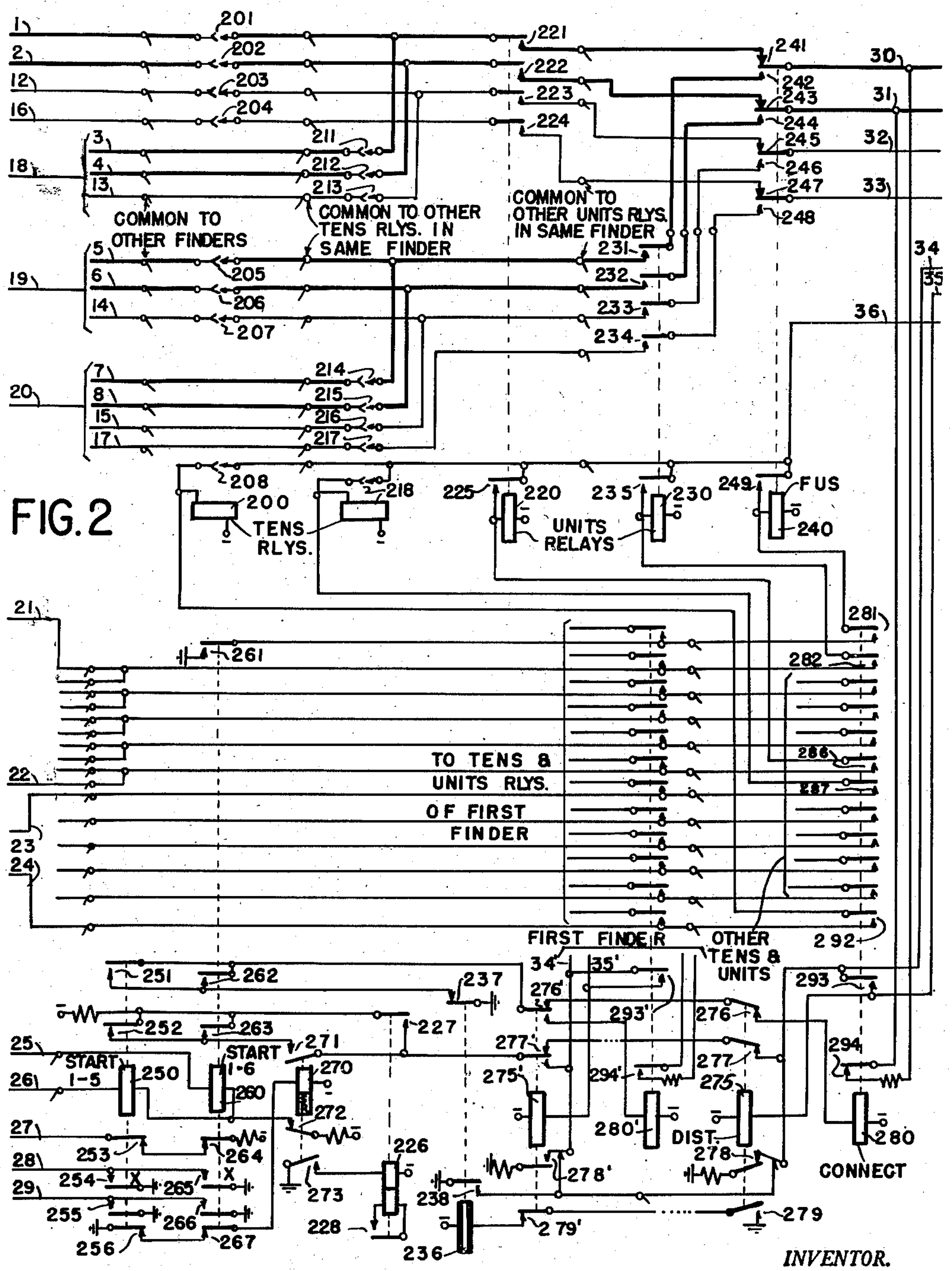
Figure 2 shows a call allotter and a line finder circuit.
Figure 3:
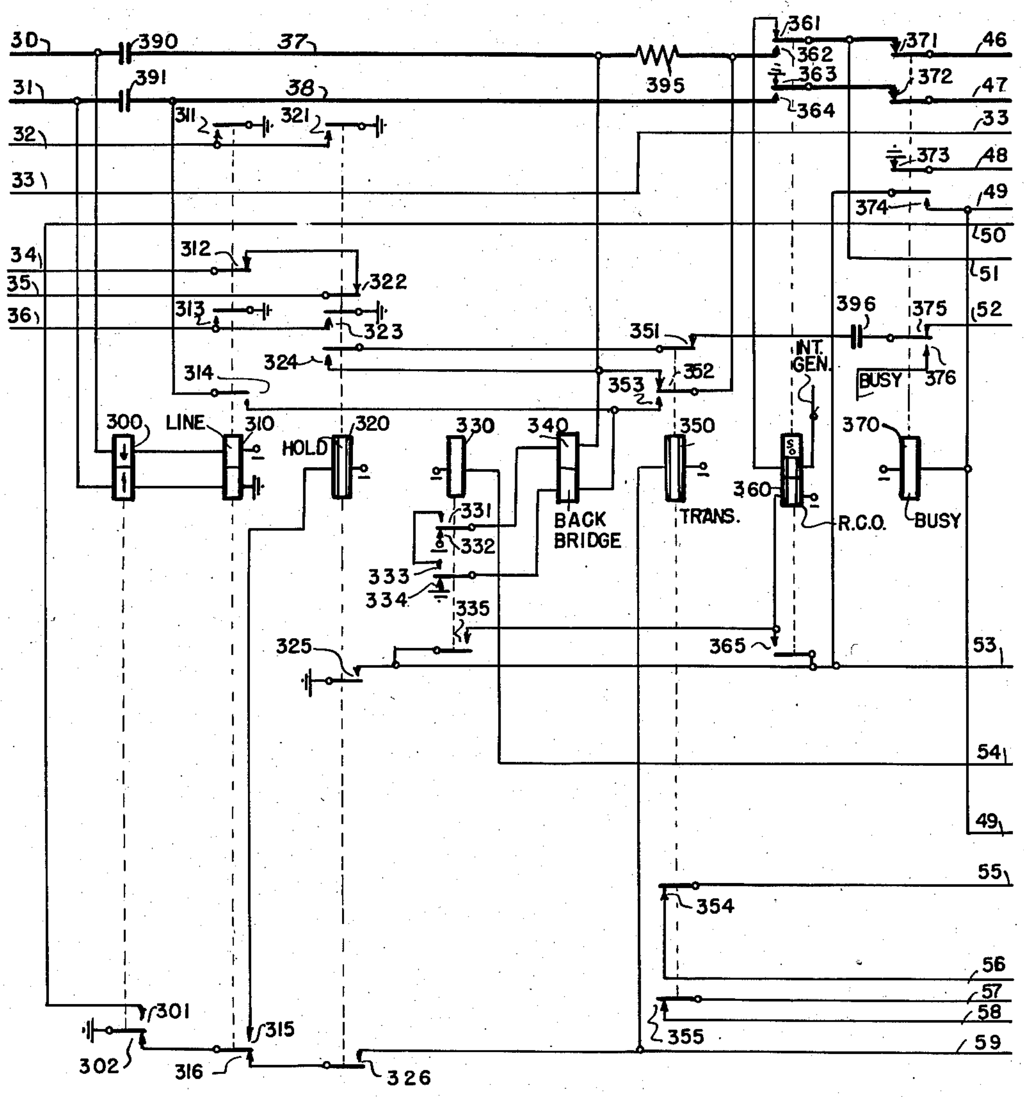
Figures 3, 4, 6, 7 and 8 show the relays of the local link connector.
Figure 4:
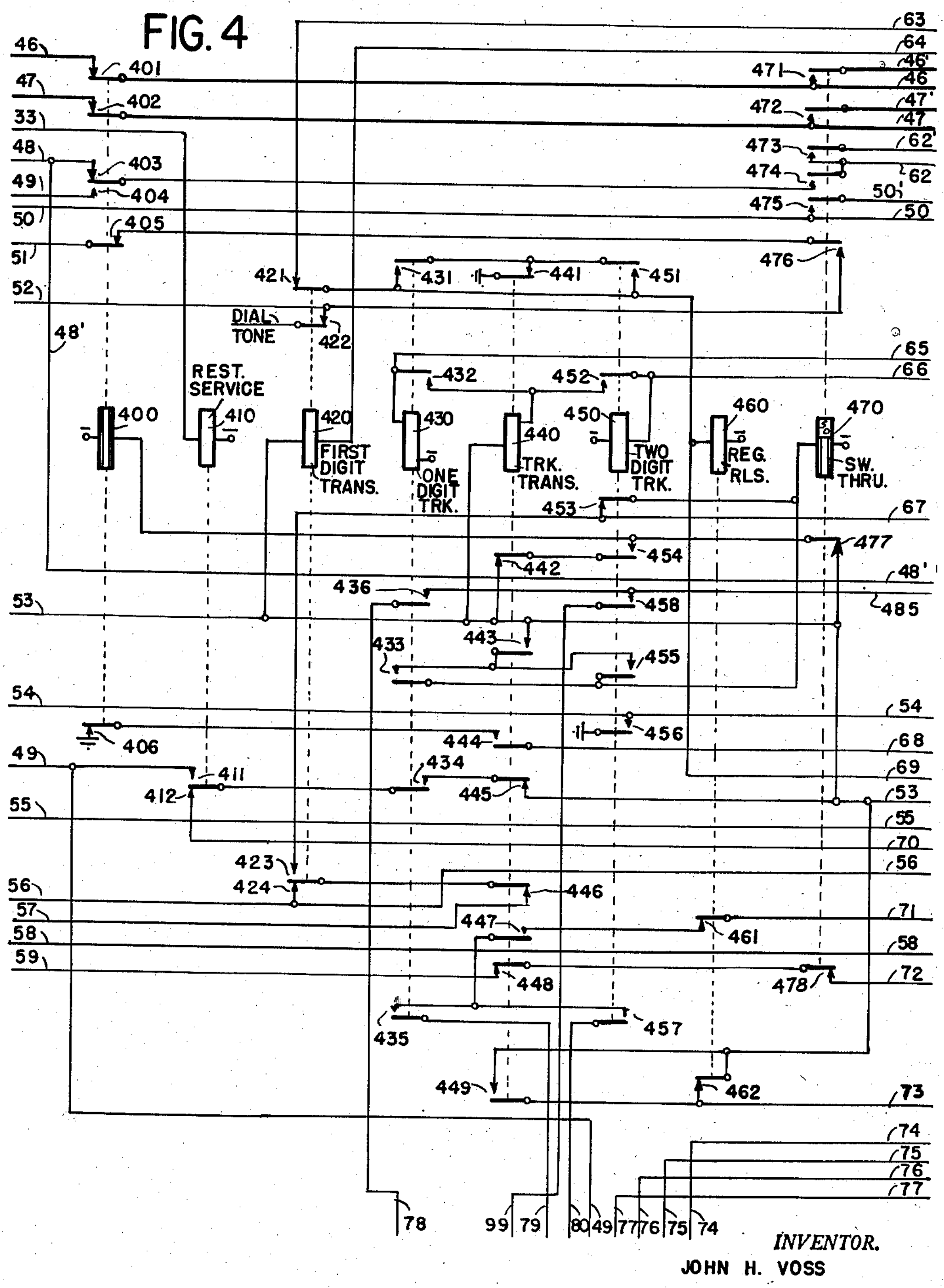

Referring to Figure 2, finder start relay 250 is designed to be operated by all lines having digit designations ending in 1 through 5, and finder start relay 260 to be operated by all lines having digit designations ending in 6 through 0. It may be assumed that there are any number of finders, the exact number being dependent on the type service required. Only the allotter relays for the first and last finder have been shown, the first being busy and in its inoperative position, and the last being idle and in its operative position to preselect this last finder. The connect relay, such as 280, complete the circuits to the finder tens and finder units relays which correspond to the number of the calling line. Only two relays of the units relays have been shown (220 and 230), whereas, actually five are used. Two of the tens group of relays have also been shown (200 and 210), but their total number is dependent on the number of groups of lines to be served by the equipment. If 50 lines are served, 5 tens relays are needed, or if 80 lines are served, 8 tens relays are needed. Normally, more than a hundred lines can not be served. The operation of start relay 260 will cause the finder unit switching relay 240 to operate so that the connection will be extended through its front contacts of all lines ending in 6 through 0. When the finder start relay 250 is operated, relay 240 is inoperative and the connection is extended by way of its back contacts for all lines ending in 1 through 5. It is therefore evident that the units relays each operate an additional group of contacts similar to the ones shown, thus completing a connection through either the front or back contacts of relay 240, dependent on the number of the calling line.

Figure 7:
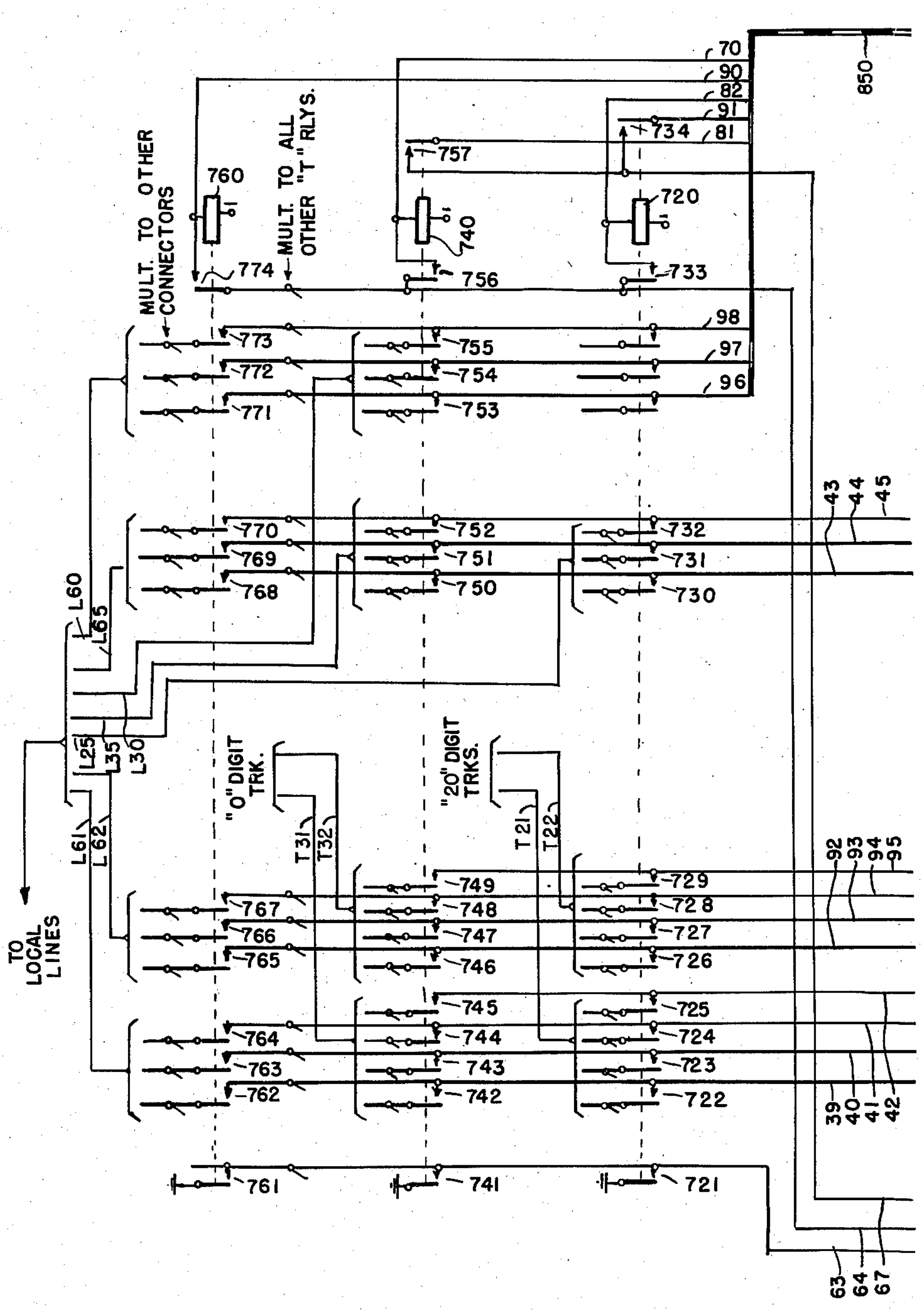
Figure 8:
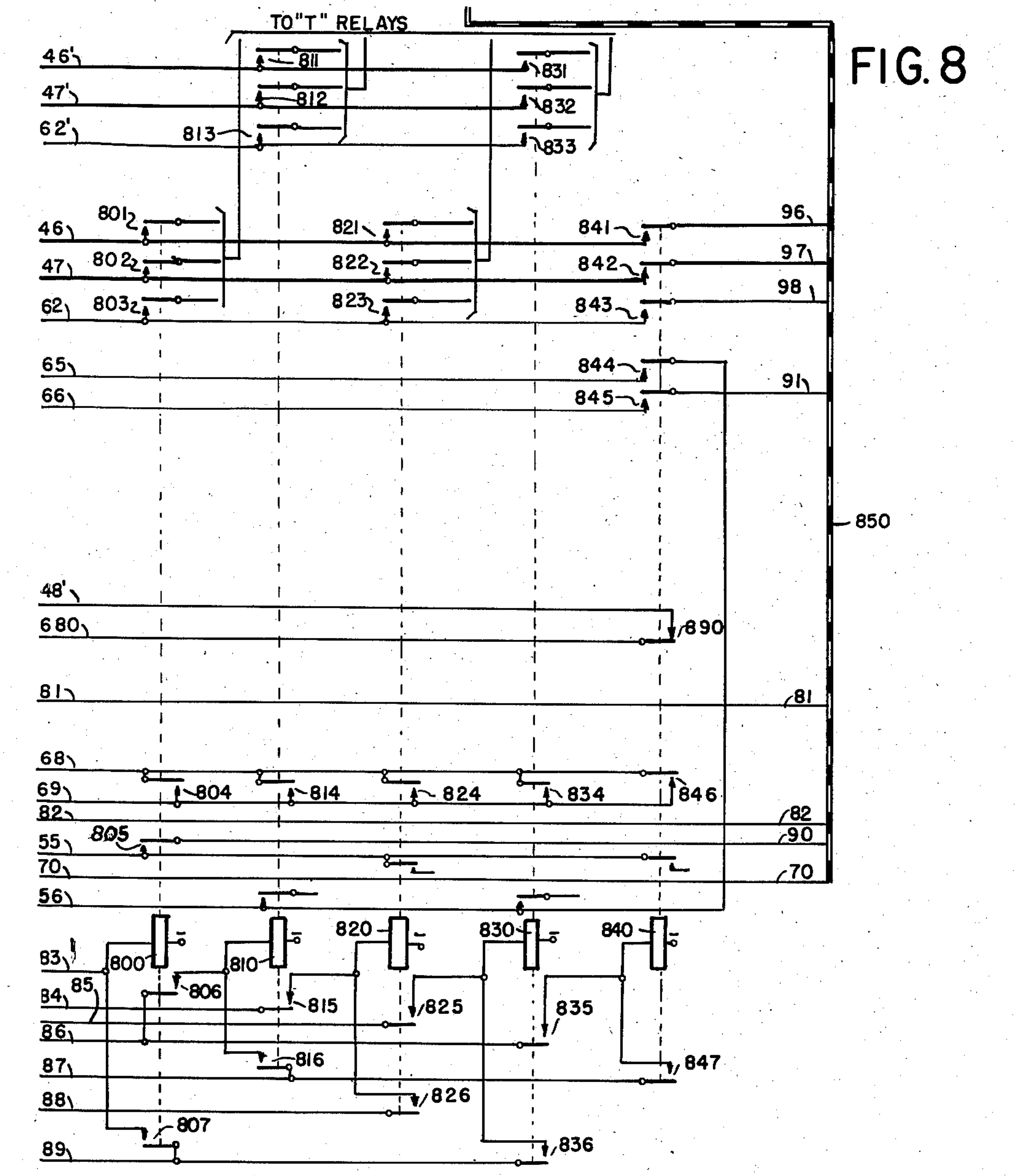

Referring to Figures 3, 4, 6, 7 and 8 which show the connector, the relays 310 and 320 are operated after the finder makes connection with the calling line, and ground conductors 32 and 36 to hold the linefinder and calling line equipment operated and disconnects conductor 34 from conductor 35 to busy the associated linefinder to other calls. The calling party now receives dial tone and dials the desired number. Relay 310 follows the series of impulses and operates relay 350 and the counting relays (Figures 6 and 8), of the register. The counting relays advance in response to each pulse of the series. There are ten counting relays, each corresponding to a single digit from 1 through 0. The tens or "T" relays (Figure 7) are energized through contacts of the counting relays after the first series of pulses. The next series of pulses energizes only the counting relays, with the last counting relay switching the call through to the contacts of the selected "T" relay. By dialing the single digit "0," trunk hunting service is provided for automatically selecting an idle central office trunk. The dialing of "0" results in the energization of "T" relay 740, which then closes its contacts. "T" relay 740 has four trunks assigned to it and such trunks may be numbered T-31 through T-34. By dialing the two digit number "20," trunk hunting service is provided for automatically selecting an idle private business exchange trunk. The dialing of the digit "2" energizes the "T" relay 720. "T" relay 720 may be assumed to be the second "T" relay, and has four trunks assigned to it which may be numbered T-21 through T-24. The dialing of the digit "0" (following the digit "2") starts the automatic hunting of an idle trunk. The remaining groups of contact sets of each of the "T" relays 720 and 740 complete connections to local lines which may be numbered L-25 through L-29, L-30 and L-35 through L-39 respectively. Figure 7 has been drawn showing "T" relay 760 as the sixth in number of the "T" relays. The first, fourth and fifth have not been shown, as their connections and operation would be similar to that of relay 760. The "T" relays need not be limited to six, as their number is dependent upon the number of lines to be served, bearing in mind that this is a small exchange serving less than a hundred lines. The drawing illustrates an exchange serving a capacity of 8 trunks and 51 local lines.

Figures 5, 9:
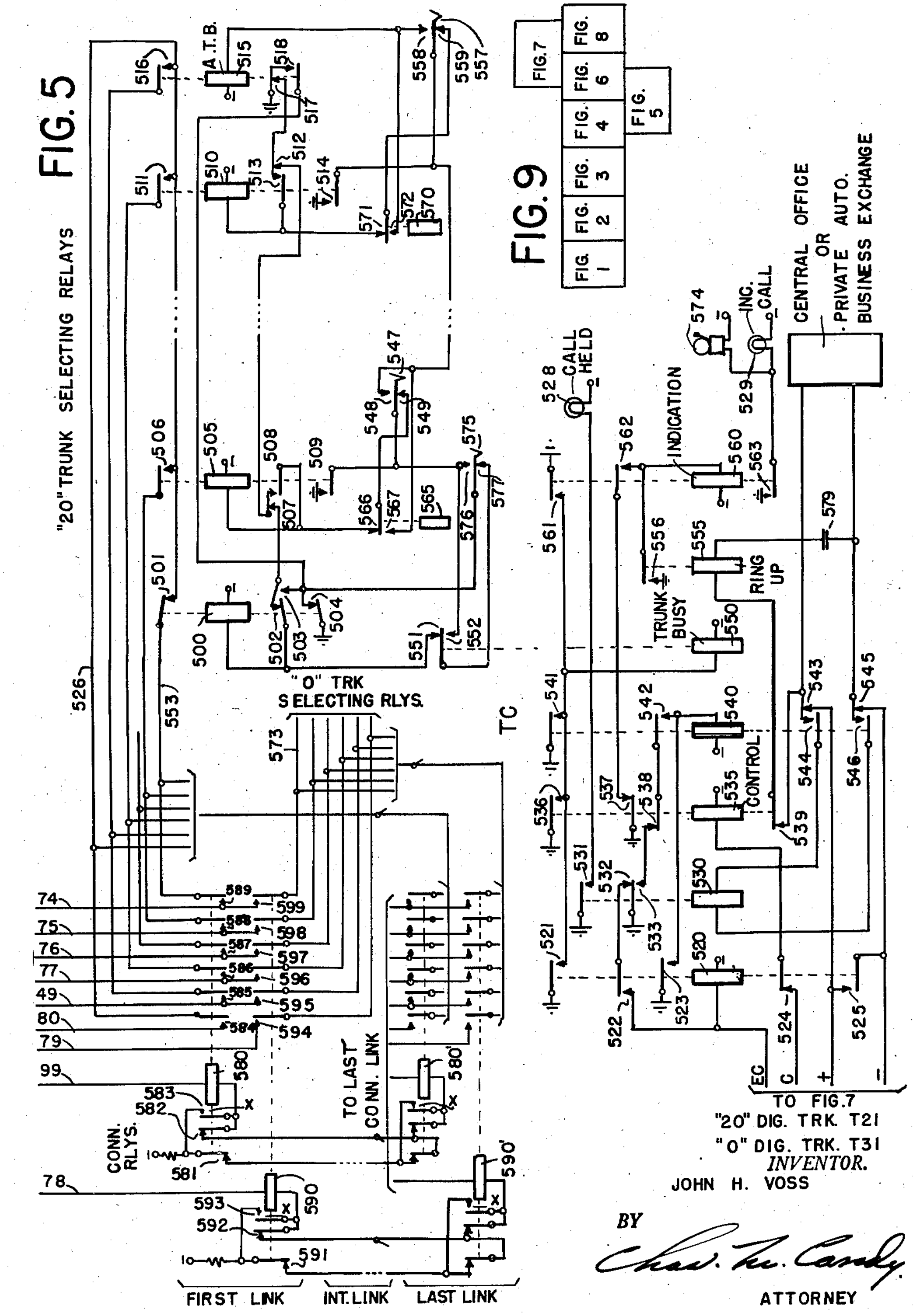
Figure 5 shows a two-way automatic trunk selecting circuit, and the connect relays necessary to its correct operation.
Figure 6:
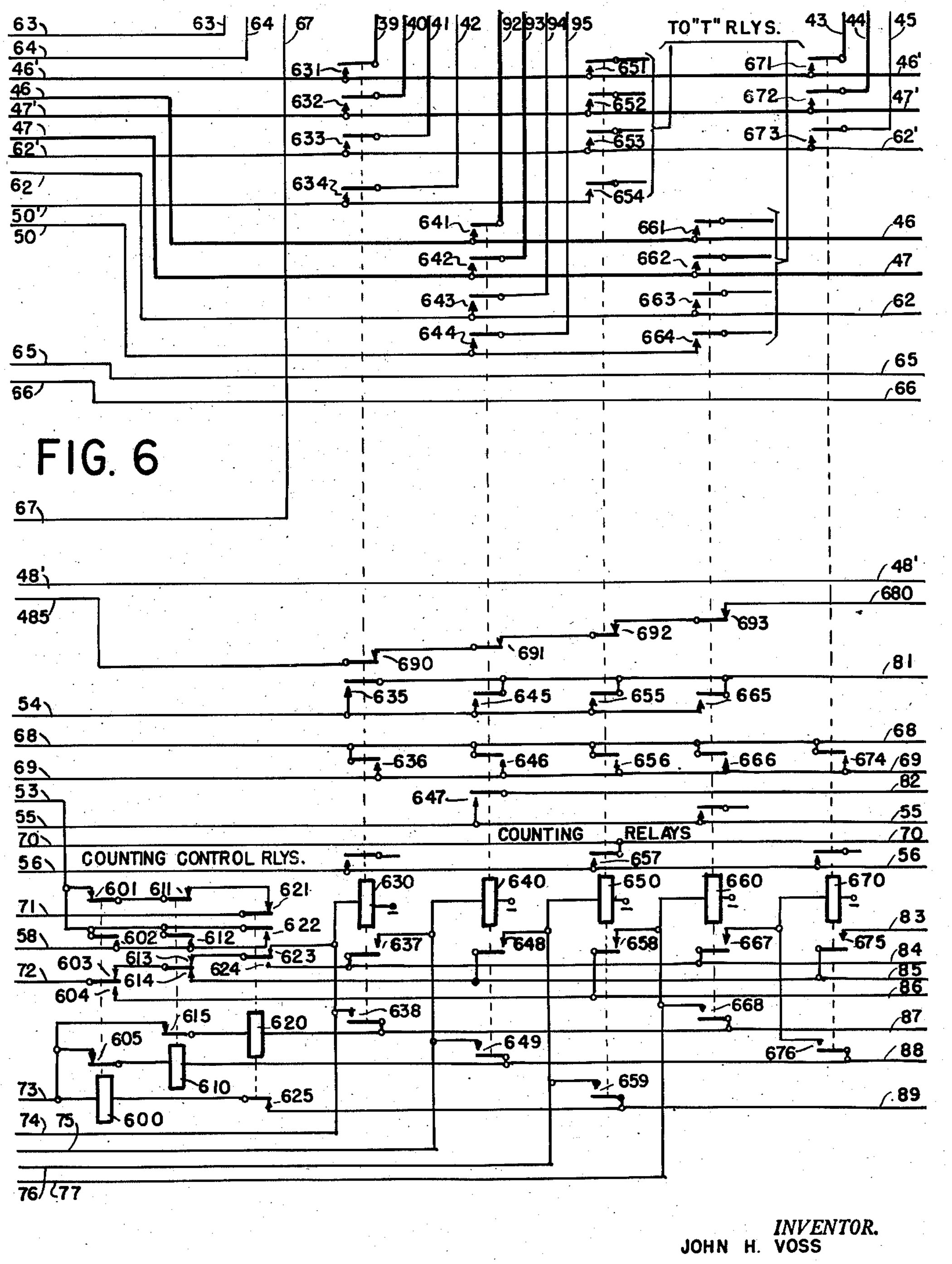

Referring to Figure 5, which shows the automatic two-way trunk selecting equipment. The relays 500, 505 and 510 are three of the four trunk selecting relays, while the fourth one necessary for four trunk service is not shown because their operations are identical. These relays may be referred to hereafter as the trunk selecting relays. The connect relays 580 and 590 are actually a part of the connector link, but being individual to the respective trunk groups shown in Figure 5. The connect relays individual to the connector links for each trunk group are respectively connected together by a universal chain circuit and their operation is well-known to the relay art. Each of the trunk selecting relays is controlled by a trunk circuit, such as the circuit (T. C.) shown in the lower half of Figure 5. The relay 515 is common to all the trunk selecting relays. The illustrated trunk circuit (T. C.) is connected to show two digit trunking service. The single digit trunk circuit is identical to the two digit trunk circuit, but connected to the contacts of the connect relay 590. The circuits of the trunk selecting relays are designed to preselect idle trunks and when one of the trunk selecting relays is operated the corresponding trunk is preselected and is idle. The register relays 630, 640, 650 and 660 (Figure 6) are respectively controlled by the four trunk selecting relays and their associated circuits; that is, if trunk selecting relay 500 is operated, its contacts 501 will complete a prepared circuit for the relay 630, or if trunk selecting relay 505 is operated, its contacts 506 would complete a circuit for the relay 640.

Incoming trunk calls will result in the proper relays of the trunk circuit, individual to that trunk, being energized, thereby causing the signalling apparatus such as 574 to transmit an audible signal. At the same time the visible signal such as 529 will light, indicating the trunk number of the incoming trunk call. Both of these signalling devices may be centrally located in a large office, thus being audible and visible to any number of subscribers. In this arrangement, any subscriber may dial the indicated trunk number and answer the call.

The linefinder and line equipment as illustrated herein may be of the type disclosed in U. S. Patent 2,472,428 issued June 7, 1949, to Roy W. Jones.

*Local to local call*

The operation of the equipment from the origin of a local call to its completion will now be described.

It is asumed that subscriber A at line L-11 intends to place a call to a subscriber on line L-65. The receiver is removed at station A and completes a loop over conductors 1 and 2. Line relay 140 is energized through its upper winding by a circuit extending from ground through contacts 102, conductor 2, the closed loop, conductor 1, contacts 101, the upper winding of relay 140, conductor 27, contacts 253 and 264 to battery. At contacts 141, line relay 140 prepares its own locking circuit. At contact 142, line relay 140 applies a ground potential to its incoming C conductor, thereby busying the calling line and preventing any incoming calls while the present call is being made. At contacts 143, relay 140 opens a circuit to the cut-off relay 100. At contacts 144, relay 140 prepares the marking of the tens conductor 24. At contacts 145, relay 140 prepares the marking of the units conductor 22. At contacts 146, relay 140 completes a circuit for energizing the start relay 250, this circuit extending by way of ground at contacts 146, conductor 26, the winding of relay 250 and operated contacts 272 to battery.

The "X" contacts 254 of relay 250 close prior to the closing of its other contacts and completes the locking circuit of the line relay 140. This circuit extending from ground at contacts 254, conductor 28, the chain circuit through the back contacts 172, 162, 152, other line relays, contacts 141, 103 and the lower winding of relay 140 to battery. At contacts 251, relay 250 completes the circuit for energizing the connect relay 280 of the preselected finder. This circuit extending by way of ground at contacts 237, contacts 251, 276', 276 and the winding of relay 280 to battery. At contacts 252, relay 250 prepares a "kick-off" circuit for shunting the connect relay 280 to cause it to release in case the linefinder has not located the calling line within the release time of the slow-to-release relay 270. At contacts 253, relay 250 opens the operating circuit of the line relay 140 and all other line relays. At contacts 255, relay 250 applies a ground potential for marking the tens conductor 24 and the units conductor 22. At contacts 256, relay 250 opens the circuit to the slow to release relay 270.

As the connect relay 280 closes its contacts it will be noted that only the tens and units relays to be energized will be the ones whose circuits are completed by way of the marked conductors 22 and 24, and that the finder unit switching relay 240 will only be energized through contacts such as 281 when the start relay 260 (instead of 250) applies ground at contacts 261. At contacts 286, relay 280 completes a circuit to the units relay 220. This circuit extending by way of the aforementioned ground and over the marking conductor 22, contacts 286 and the winding of units relay 220 to battery. At contacts 292, relay 280 completes the circuit to the tens relay 200. This circuit extending by way of the previously mentioned ground and over the marking conductor 24, contacts 292 and the winding of tens relay 200 to battery. At contacts 293, relay 280 completes a circuit between conductors 34 and 35 to maintain the finder distributor relay 275 in its operated position. At contacts 294, relay 280 places a shunt across the line conductors 30 and 31, thereby seizing the linefinder's associated connector and completing a circuit through the differential relay 300 and the line relay 310. The tens relay 200 and units relay 220 each operate their respective sets of contacts and thereby extend the calling line through to the associated connector in an obvious manner.

In operating, at contacts 311, line relay 310 completes a circuit to the cut off relay 100, which extends by way of ground at contacts 311, conductor 32, contacts 245, 223, 203, conductor 12 and through the winding of relay 100 to battery. At contacts 312, relay 310 disconnects conductor 34 from conductor 35 in the connector, but such conductors are still connected at contacts 293. At contacts 313, relay 310 applies ground to the holding conductor 36 which provides the tens relay 200 and units relay 220 with an obvious locking circuit extending through their contacts 208 and 225 respectively. At contacts 314, relay 310 prepares a pulse repeating circuit (used only during trunk calls) for repeating dial pulses to a central office, if the office is automatic. At contacts 315, relay 310 completes a circuit for the hold relay 320, which extends by way of ground at contacts 302, 315 and the winding of relay 320 to battery.

At contacts 101 and 102, cut-off relay 100 opens the operating circuit of the line relay 140 in an obvious manner. At contacts 103, relay 100 opens the holding circuit for relay 140 allowing it to restore. In restoring, at contacts 146, relay 140 opens the circuit to the start relay 250, which upon releasing, opens the circuit to the connect relay 280. Connect relay 280 restores and disconnects the marking leads from the finder tens and units relays. In restoring, at contacts 293, relay 280 opens the circuit to the distributor relay 275. In restoring, at contacts 279, relay 275 completes a circuit to the relay 236 in an obvious manner. At contacts 238, relay 236 applies ground to the break-before-make contacts of armatures 278 and 278′ of all the distributor relays such as 275 and 275′. This ground completes the energizing circuit to all the distributor relays such as 275 and 275′, which are released in order to preselect idle finders in rotation for subsequent calling lines. When any distributor relay is energized, the circuit to relay 236 is opened, allowing relay 236 to restore. The linefinder tens and units relays associated with the calling line 11 are locked operated during the period that either the pulse relay 310 or the hold relay 320 are energized. As the connect relay 280 has restored, and the former energizing circuit for the relay 310 is opened, relay 310 is maintained energized over the extended closed calling subscribers' loop.

Referring to the seized connector, its subsequent operations after the energization of the hold relay 320 will be discussed. At its contacts 321, the relay 320 applies ground to the conductor 32 which maintains the cut-off relay 100 operated. At contacts 322, relay 320 maintains the conductors 34 and 35 open to indicate the busy condition of the connector. At contacts 323, relay 320 applies ground potential to the hold conductor 36 to maintain the tens relay 200 and units relay 220 operated. At contacts 324, relay 320 completes the circuit, allowing dial tone to be transmitted over the negative line, this circuit extending by way of contacts 422, conductor 52, contacts 375, condenser 396, contacts 351, 324 and conductor 37 to the calling subscriber. At contacts 325, relay 320 completes the circuit to relay 400, this circuit extending by way of ground at contacts 325, conductor 53, contacts 477 and the winding of relay 400 to battery. At contacts 326, relay 320 prepares a pulsing circuit for energizing the transfer relay 350 and the register counting relays.

Dial tone is now transmitted back to the calling subscribers in a well-known manner and the calling party upon hearing the dial tone, dials the first or "tens" digit of the called number "65" which is 6, thereby causing the connector line relay 310 to release and reoperate six times. Upon the first release of relay 310, the opening of contacts 315 opens the holding circuit to the hold relay 320 which is a slow-to-release relay having a copper sleeve over its core and therefore, will not restore during impulsing, the closing of contacts 316 completes a multiple circuit to the transfer relay 350 and the register counting relays. These circuits extending by way of ground at contacts 302, contacts 316, 326, and divided (1) up through the winding of the transfer relay 350 to battery and (2) to the right over conductor 59, contacts 448, 478, conductor 72, contacts 603, 613, 623 and through the winding of the first counting relay 630 to battery. The transfer relay 350 operates, and having slow-to-release characteristics will remain operated during dialing, thereby, opening the operate circuits from the top contacts of all the counting relays at its contacts 354 and 355. At contacts 351, relay 350 removes dial tone from the calling line.

The first pulse of the tens digit of the called number "65" has now released line relay 310 and energized counting relay 630. At contacts 637, relay 630 prepares a circuit for the second counting relay 640. At contacts 638, relay 630 prepares a circuit for the counting control relay 620, but as the relay 620 has ground on one side of its winding and the ground pulse on the other side, it will not operate. After completion of the first pulse, line relay 310 again energizes and removes the ground via contacts 316 over the previously traced circuit. Relay 630 remains energized, but over a circuit in series with the counting control relay 620 which energizes over a circuit extending from the grounded conductor 53, contacts 462, conductor 73, contacts 615, winding of relay 620, contacts 638 and winding of relay 630 to battery. At contacts 623 and 624, relay 620 opens the pulsing circuit to relay 630 and prepares the pulsing circuit to counting relay 640. At the beginning of the second pulse, relay 640 energizes from ground on the pulsing lead 59 and prepares a circuit for relays 650 and 610 at contacts 648 and 649. The removal of the second ground pulse on conductor 59 leaves relay 640 energized over a circuit in series with relay 610 which has energized over a path similar to the one described for relay 620. At contacts 615, relay 610 opens the circuit to relays 620 and 630 and they release. At contacts 614, relay 610 prepares a circuit for relay 650. At the beginning of the third ground pulse over conductor 59, relay 650 energizes and prepares a circuit for relays 660 and 600 at contacts 658 and 659. The removal of the third pulse leaves the relay 650 energized over a circuit in series with the relay 600 which has energized over a path similar to the ones previously described. The fourth, fifth and sixth pulses and their operations of counting relays 660, 670 and 800 with their respective counting control relays 620, 610 and 600 will not be described as it is similar to the first three pulses.

It will now be assumed that the sixth pulse has been completed and the line relay 310 is again energized, the transfer relay 350 will release after a short interval and counting relay 800 and counting control relay 600 are energized. The release of transfer relay 350 closes contacts 354 and 355 which completes the operate circuits through the operated contacts of the counting relays. At contacts 805, counting relay 800 prepares a circuit to the tens or "T" relay 760 which circuit is completed when the slow-to-release transfer relay 350 restores. At contacts 602, counting control relay 600 also prepares a circuit for the "T" relay 760. The circuit for operating relay 760 extends from the grounded conductor 53, contacts 602, conductor 58, contacts 355, conductor 57, contacts 446, 424, conductor 56, contacts 354, conductor 55, contacts 805, conductor 90, cable 850 and conductor 90 through the winding of "T" relay 760 to battery. At contacts 762 to 773, "T" relay 760 prepares for the extension of the calling line to any one of ten lines terminating at these contacts. At contacts 761, relay 760 completes a circuit for the register release relay 460, extending by way of ground at contacts 761, conductor 63, contacts 421 and through the winding of relay 460 to battery. At contacts 774, relay 760 prepares a circuit for the first digit transfer relay 420 in series with itself, at the present this circuit is inoperative because the relay 760 is maintained operated over the previously traced circuit and the relay 420 is inoperative because of the ground potential applied to both sides of its winding.

In operating, register release relay 460 opens contacts 462 and removes ground from the counting control relay 600 and counting relay 800, thereby allowing them to restore. At their respective contacts 602 and 805, the relays 600 and 800 remove ground and open the circuit to the "T" relay 760, which remains operated, but now in series with the first digit transfer relay 420. This circuit extending from the grounded conductor 53, winding of relay 420, conductor 64, contacts 774 and the winding of relay 760 to battery.

In operating, first digit transfer relay 420 opens the circuit at contacts 421 to the register release relay 460, thereby allowing it to restore. At contacts 422, relay 420 removes dial tone from the calling line. At contacts 423, relay 420 prepares an operating circuit for the switch through relay 470.

The equipment is now ready to receive the last or "units" digit of the called number "65." As the digit 5 is dialed, the connector line relay 310 is caused to release and reoperate five times. The slow-to-release transfer relay 350 energizes with the first ground pulse and remains energized during dialing. The operation of the counting control relays and counting relays will not be discussed for this second and last digit, because the operation is identical to that during the dialing of the first digit. It will be assumed that the dialing of digit 5 has been completed and the counting control relay 610 has energized over a circuit in series with the counting relay 670, and the transfer relay 350 has restored. At contacts 671, 672 and 673, counting relay 670 prepares the extension of the calling line, and as the relay 670 corresponds to the unit 5, it may be seen that the extension is prepared to all lines whose last digits are 5. Thus, from the foregoing description since the tens relay 760 corresponding to the tens digit 6 is operated, it is evident that the selected extension is to the line L–65. At contacts 355 transfer relay 350 completes a circuit for the switch through relay 470, this circuit extending by way of the ground conductor 53, contacts 612, conductor 58, contacts 355, conductor 57, contacts 446, 423, 453 and through the winding of relay 470 to battery.

In operating contacts 471 to 475, relay 470 further prepares the extension to the called line. At contacts 477, relay 470 opens the circuit to relay 400. At contacts 478, relay 470 opens the pulsing circuit to the counting relays. At contacts 476, relay 470 prepares a "ring-back" circuit in an obvious manner. As the relay 400 is relatively slow-to-release and should there be a ground on the conductor terminating at contacts 404 (indicating that the called line is busy), a circuit would be completed through contacts 404 (before the relay 400 has restored) for energizing the busy relay 370 which would operate over a circuit from ground on the test lead of the called busy line L–65, contacts 770, conductor 45, contacts 673, conductor 62′, contacts 473, 474, 404, conductor 49 and through the winding of busy relay 370 to battery. Busy relay 370 operates over the above-traced circuit to transmit a busy tone via its contacts 376 to the calling line. Relay 370 at contacts 371 and 372 disconnects the connector incoming and outgoing talking conductors and locks itself operated to grounded conductor 53 at contacts 374.

It will now be assumed that the called line is idle, therefore, relay 370 will not operate, instead when relay 400 restores, ringing current is transmitted over the called line. The circuit for transmitting ringing current to the called line may be traced as follows: from interrupted generator (Int. Gen.), upper winding of ring cut-off relay 360, contacts 361, 371, conductor 46, 401, 471, conductor 46′, contacts 671, conductor 43 and 768 to the negative line conductors of the called line, through the ringer at the called substation, back over the positive line conductor, contacts 769, conductor 44, contacts 672, conductor 47′, contacts 472, 402, conductor 47, contacts 372 and 363 to ground. When the called party answers, a direct current circuit is completed through the upper winding of the ring cut-off relay 360, causing relay 360 to operate, which then locks itself operated from the grounded conductor 53, through contacts 365 and over the lower winding of relay 360 to battery. At contacts 362 and 364, ring cut-off relay 360 completes the extension of the talking connection to the called line. The back-bridge relay 340 (actually an impedance coil) supplies talking current to the called party by way of ground at contacts 334, the lower coil of relay 340, over the positive talking conductor, through the closed loop, back over the negative talking conductor, through the coil of relay 340 and through contacts 332 to battery.

When the conversation is completed, both subscribers replace their receivers. The replacing of the calling subscriber's receiver opens the loop over the line L-11 and the line relay 310 restores. At contacts 315, relay 310 opens the circuit to the hold relay 320, allowing it to restore. These two relays release their respective ground contacts 313 and 323 allowing the tens relay 200, and units relay 220 to restore, thereby completely releasing the finder. The circuit is opened to the cut-off relay 100 at contacts 321 and it restores. Hold relay 320 removes the ground potential from the grounded conductor 53, at contacts 325, and as a result the following relays restore: the first digit transfer relay 420, switch through relay 470, "T" relay 760, counting relay 670, counting control relay 610 and ring cut-off relay 360.

The equipment is now at rest and conditioned to handle future calls.

Trunk lines T31, T32, T33 and T34 in the "0" digit trunk group may each be individually called in the same manner as just described for calling a two-digit local line by dialing the individual call numbers 31, 32, 33 or 34, respectively designating each trunk. If trunk T31 is called, counting relay 650 at contacts 657 completes a circuit over conductor 70 for operating tens relay 750 in response to dialling the tens digit 3. In response to dialling the units digit 1, counting relay 630 operates to complete the talking connecting through operated contacts on both the tens relay 740 and counting relay 630. The manner in which an idle one of these trunks is connected with in response to dialling the signal digit "0," designating this trunk group, will be described in detail hereinafter.

Trunk lines T21, T22, T23 and T24 in the "20" digit trunk group may each be individually called in the same manner as just described for calling a two-digit local line by dialling the individual call numbers 21, 22, 23 or 24, respectively designating each trunk. The tens relay 720 is operated responsive to dialling the digit 2, and the corresponding counting relays are operated to complete the talking connecting in response to the last digit dialled.

It will be noted that a push-button 9 is included at certain subscriber stations such as subscriber A, and should subscriber A desire to make another local call or a trunk call immediately following the conversation with the local subscriber on line L-65 without replacing his receiver, push-button 9 is momentarily depressed. The depressing of push-button 9 causes differential relay 300 to operate, which will then initiate the release of the connector portion of the associated finder-connector link and thereby disconnect from the called line L-65, while maintaining the finder portion of this link, in order to reuse the connector portion of the same link to connect station A with a subsequent local line or trunk. The release of the connector portion, responsive to the operation of push-button 9, will be described in detail hereinafter.

*Two digit trunk calls*

The operation of the equipment as to the selection of a trunk to a private automatic business exchange by two digits will now be explained.

The two digit number "20" has been selected as the number to be dialed when the calling line desires a private automatic business exchange trunk. It may be assumed that any one of the illustrated subscribers A through D will make the trunk call. As the receiver is removed at the calling station, a bridge is placed across its talking conductors resulting in operation of previous operations during the initiation of a local call. It will be assumed the associated connector has been seized and all the relays energized and operated as necessary for the dialing of the first digit "2" of the number "20."

The digit "2" is dialed and the line relay 310 releases and reoperates twice, with the transfer relay 350 energizing on the first grounded pulse and remaining energized while dialing. The sequence of operation of the counting control relays and counting relays is the same as that of the previously described local call. At the end of the second pulse, the counting relay 640 and counting control relay 610 are energized in series with one another and the circuit has been opened to the transfer relay 350, allowing it to restore and close its contacts 351 through 355. At contacts 647, relay 640 completes the circuit to the "T" relay 720, which operates and closes its contacts 721 to 734. This circuit may be traced as follows: from grounded conductor 53, contacts 612, conductor 58, contacts 355, 446, 424, 354, conductor 55, contacts 647, conductor 82 of cable 850 and through the winding of relay 720 to battery. At contacts 721, relay 720 completes a circuit for the register release relay 460, this circuit extending by way of ground at contacts 721, conductor 63, contacts 421 and the winding of relay 460 to battery. At contacts 722 through 732, relay 720 prepares to extend the calling line to local lines, such as L-25, or to trunks such as T-21 and T-22. At contacts 733, relay 720 prepares an operative circuit for the first digit transfer relay 420 in series with itself. At contacts 734, relay 720 prepares a circuit for the two digit trunking relay 450.

In operating contacts 462, the register release relay 460 opens the circuit to the register relays 640 and 610, allowing them to restore. As the register relays restore, the previous circuit for the "T" relay 720 is opened, but the relay 720 remains operated in series with the now operated first digit transfer relay 420, this circuit extending by way of the grounded conductor 53, winding of relay 420, conductor 64, contacts 733 and the winding of relay 720 to battery.

In operating contacts 421, the first digit transfer relay 420 opens the circuit to the register release relay 460, allowing relay 460 to restore. At contacts 422, relay 420 removes dial tone from the calling line. At contacts 423, relay 420 prepares a circuit for the two digit trunking relay 450.

The system is ready for the second or "0" digit of the two digit trunk hunting number "20." The digit "0" is dialed and the line relay 310 releases and reoperates ten times, with the transfer relay 350 energizing on the first grounded pulse and remaining energized while dialing. The sequence of operations of the counting control and counting relays is the same as that described in the previous descriptions. At the end of the tenth pulse, the counting relay 840 and counting control relay 620 are energized in series with one another and the circuit has been opened to the transfer relay 350, allowing it to restore and again close its contacts 351 to 355. As the counting and counting control relays 840 and 620 close their contacts 845 and 622 respectively, a circuit is completed to the two digit trunking relay 450, this circuit extending by way of grounded conductor 53, contacts 622, conductor 58, contacts 355, conductor 57, contacts 446, 423, conductor 67, contacts 734, conductor 91, cable 850, conductor 91, contacts 845, conductor 66 and the winding of relay 450 to battery. A circuit is also completed to the switch-through relay 470, but its slow-to-operate characteristics prevent it from operating with the relay 450.

Relay 450 upon operating, opens the circuit to relay 470 at contacts 453. At contacts 451, relay 450 completes an obvious circuit to the register release relay 460. At contacts 452, relay 450 prepares an operative circuit for the trunk transfer relay 440 in series with itself, which circuit is ineffective until the counting control relay 620 restores. At contacts 458, relay 450 prepares a circuit to the connect relay 580. At contacts 455, relay 450 prepares a circuit to the switch-through relay 470. At contacts 456, relay 450 completes an obvious circuit to relay 330. At contacts 457, relay 450 prepares a circuit to any one of the counting relays preselected by the trunk selecting equipment in Figure 5.

In operating contacts 331 and 333, relay 330 removes talking battery from the conductors 37 and 38 and places a bridge across such conductors. At contacts 335, relay 330 completes a circuit to the slow-to-operate ring cut-off relay 360, which locks itself operated from grounded conductor 53 and contacts 365 and prepares for the extension of the calling line at contacts 362 and 364.

In operating contacts 462, register release relay 460 opens the circuit to the register relays 840 and 620. In restoring, at contacts 890, counting relay 840 completes a circuit to the connect relay 580, this circuit extending by way of ground at contacts 373, conductor 48, 48′, contacts 890, 693, 692, 691, 690, 458, conductor 99, winding of relay 580 and the chain circuits of the other connect relays including contacts 582 and 581 back to battery at relay 580. Relay 580 then locks itself energized through its "X" contacts 583. Relay 580 closes contacts 584 to 589 to prepare the energizing circuit of a counting relay to be selected by one of the trunk selecting relays. As the previous circuit for the two digit trunking relay 450 is opened by the release of the register relays 840 and 620, relay 450 is now maintained operated in series with the trunk transfer relay 440, this circuit now extending from the grounded conductor 53, winding of relay 440, contacts 452 and the winding of relay 450 to battery.

In operating contacts 441, trunk transfer relay 440 opens the circuit to register release relay 460, allowing relay 460 to restore. At contacts 443, relay 440 completes a circuit to the switch-through relay 470, this circuit extending from the grounded conductor 53, contacts 443, 455 and the winding of relay 470 to battery. At contacts 444, relay 440 prepares a circuit for the future energization of relay 460. At contacts 447, relay 440 prepares a circuit to a selected counting relay through contacts of the trunk selecting relays. At contacts 449, relay 440 prepares a circuit to maintain the selected register relays energized during the time the register release relay 460 is energized.

Before continuing with the present operation, a short explanation of the operation of the trunk selecting equipment (Figure 5) will be given. As illustrated the trunk selecting circuit consists of the three trunk selecting relays 500, 505 and 510 (the fourth is not shown) and their respective circuits. The all-trunk-busy relay 515 is common to all trunk selecting relays, while the trunk circuit (T. C.) and equipment as shown in the lower half of Figure 5 is individual to trunk selecting relay 500. Other trunk circuits not shown but similar to trunk circuit T. C., are provided for each trunk selecting relay such as relays 505 and 510. Each trunk circuit has a trunk-busy relay such as relays 550, 565 and 570, for controlling the trunk selecting relays 500, 505 and 510 to preselect idle ones of said trunk lines in rotation. It is to be noted, that one of the trunk selecting relays or the all-trunk busy relay such as 515 will be energized at all times during normal operating conditions and as the idle trunk circuit T. C. (associated with the energized trunk selecting relay) is seized, the individual trunk busy relay (deenergized when the trunk is idle) will energize and preselect and operate the next trunk selecting relay (whose corresponding trunk is idle) in rotation. From the foregoing it will be understood that at the end of each sequence of normal operation, the energizing of the fourth or last trunk busy relay will complete a circuit to the all-trunk busy relay such as 515, which in turn will preselect and operate the next trunk selecting relay (whose corresponding trunk is idle) in rotation. However, if all trunks are busy, the all-trunks busy relay 515 will remain operated and when the connect relay (individual to the trunk group) operates, a circuit will be completed to operate the busy relay such as 370 in the connector link. As previously stated, the all-trunk busy relay is always operated by the fourth or last trunk busy relay; however, the first, second, or third trunk busy relays may also operate the all-trunk busy relay if the succeeding trunk circuits are busy. Each trunk selecting relay controls on of the counting relays individual to the associated seized connector. The connect relays 580 and 590 are actually within the illustrated connector link, each link having its own connect relays. The connect relays such as 580 and 580′ are individual to the trunk selecting relays (Figure 5), in which a group of trunk lines each have a two digit call number. The connect relays such as 590 and 590′ are individual to a similar group of trunk selecting relays (not shown) for another group of trunk lines each having a single digit call number.

The circuits of the connect relays associated with the two digit trunk selecting relays are connected by a universal and well-known chain and the circuits of the connect relays associated with the one digit trunk selecting relays are connected by a similar chain. The trunk selecting equipment as shown, is actually the arrangement for two digit trunk service, whereas, the exchange in its entirety would consist of another identical trunk selecting arrangement for additionally providing single digit trunk service. This last arrangement is not shown, thereby avoiding repetition and unnecessary drawings.

In Figure 5, the trunk selecting relay 500 is shown in the operated position; thereby, indicating that the first trunk in the "20" trunk group, a trunk number 21 is the trunk preselected for use. This trunk is shown at T. C. in the lower left-hand corner of Figure 5. Relay 500 is locked energized over the following circuit from ground at contacts 517, contacts 512, 507, 502 and the winding of relay 500 to battery.

In operating contacts 471 to 475, switch-through relay 470 prepares for the extension of the calling line to one of the two digit trunks such as T–21. At contacts 477, relay 470 opens the circuit to relay 400, but due to the slow-to-release characteristics of relay 400 it will not restore until the subsequent operations have been completed.

In restoring contacts 461, register release relay 460 completes the circuit to the selected counting relay which in this case, is determined by the operated trunk selecting relay 500 and found to be counting relay 630. This circuit may be traced from the grounded conductor 53, contacts 601, 611, 621, conductor 71, contacts 461, 447, 457, conductor 80, contacts 584, conductor 526, contacts 501, conductor 553, contacts 589, conductor 74 and through the winding of counting relay 630 to battery.

In operating contacts 638, relay 630 prepares its own operating circuit in series with the counting control relay 620. At contacts 690, relay 630 opens the previously traced operating circuit of the connect relay 580, thus allowing relay 580 to restore.

As the connect relay 580 restores, the previously traced first operating circuit for counting relay 630 is opened at contacts 584 and 589. Counting relay 630, however, remains energized over the last mentioned series circuit with the now-operated counting control relay 620, this circuit extending by way of grounded conductor 53, contacts 462, conductor 73, contacts 615, winding of relay 620, contacts 638 and the winding of relay 630 to battery.

Relay 400 has now restored; the extension of the trunk call has been completed to the trunk circuit T. C.; the register release relay 460 has operated over a circuit which may be traced from ground at contacts 406, contacts 444, conductor 68, contacts 636, conductor 69 and the winding of relay 460 to battery; and, trunk selecting relay 500 has been restored in the following manner: the restoring of relay 400 closes contacts 403 and completes a circuit to the control relay 535 of the trunk circuit T. C., this circuit extending by way of ground at contacts 373, conductor 48, contacts 403, 474, 473, conductor 62', contacts 633, conductor 41, contacts 724, conductor C of trunk T–21, conductor C of trunk circuit T. C., contacts 524 and the winding of relay 535 to battery. In operating contacts 536, control relay 535 completes an obvious circuit to trunk busy relay 550. In operating contacts 551, relay 550 opens the operate circuit of selecting relay 500 and at contacts 552 completes a circuit to one of the next trunk selecting relays whose corresponding trunk is idle. However, should all the following trunk circuits be busy, relay 500 will remain operated for the present, by a circuit extending from ground at contacts 517, a chain of make-before-break contacts at each trunk selecting relay, contacts 502 and the winding of relay 500 to battery. Relay 500 will only remain operated long enough for either the next trunk selecting relay (whose corresponding trunk is idle) to operate, or if all are busy, the all-trunk busy relay 515 will operate. If the next trunk circuit of the trunk selecting relay 505 is idle, the relay 505 will operate over a circuit extending from ground at contacts 504, contacts 577 of the busy switch 575, contacts 549 of the busy switch 547, contacts 566 and the winding of relay 505 to battery. If all the trunk circuits are busy, the all-trunks busy relay 515 will operate over a circuit extending from ground at contacts 504, contacts 577 of busy switch 575, contacts 549 of busy switch 547, contacts 567, contacts 559 of busy switch 557, contacts 572 and the winding of relay 515 to battery. As soon as either the trunk selecting relay 505 or the all-trunks busy relay 515 operates, the holding circuit of the relay 500 is opened and relay 500 restores.

Relay 500 in restoring contacts 501, opens a point in the marking circuit, and at contacts 503 prepares its operate circuit.

Register release relay 460, in operating further opens the circuit to the energized register relays, but they are maintained operated by way of contacts 449 of the operated trunk transfer relay 440.

At the end of the conversation the calling party replaces his receiver, thus opening the closed loop over his line and opening the circuit to the line relay 310, allowing it to restore. Line relay 310 opens the circuit to hold relay 320 by way of contacts 315. The operated line equipment of the linefinder is allowed to release by the restoring of relays 310 and 315, which removes ground from conductor 36. Hold relay 320 removes ground from the grounded conductor 53 at contacts 325. The removal of this ground on conductor 53 allows the ring cut-off relay 360, first digit transfer relay 420 and the "T" relay 720, trunk transfer relay 440 and the two digit trunk relay 450, switch through relay 470 and the register relays 620 and 630 all to restore. The restoring of these relays allows relay 330, register release relay 460, control relay such as 535 and trunk busy relay such as 550 of the operated trunk circuit to restore.

The equipment is now at rest and conditioned to handle future calls.

*One digit trunk calls*

The operation of the equipment as to the automatic selection of a central office trunk by dialing a single digit will now be explained.

The single digit "0" has been selected as the number to be dialed when the calling line desires a central office trunk. It is assumed that any one of the illustrated subscribers either B or C will make the trunk call. As the receiver is removed at the calling station, a bridge is placed across its talking conductors resulting in operation of the line equipment and linefinder, similar to the previous operations during the initiation of a local call. It will be assumed that the associated connector has been seized and the relays energized and operated as previously described before the dialing of the digit "0."

The digit "0" is dialed and the line relay 310 releases and reoperates ten times, with the transfer relay 350 energizing on the first grounded pulse and remaining energized while dialing. The sequence of operation of the counting control relays and counting relays is the same as previously described.

At the end of the tenth pulse, the counting relay 840 and counting control relay 620 are energized in series with one another, and transfer relay 350 restores and closes its contacts 351 through 355.

In operating contacts 844, counting relay 840 completes the circuit to the one digit trunk relay 430, this circuit extending by way of grounded conductor 53, contacts 622, conductor 58, contacts 355, conductor 57, contacts 446, 424, to the right over conductor 56, contacts 844, conductor 65 and through the winding of relay 430 to battery.

In operating, relay 430 completes a circuit to the register release relay 460 via contacts 431, this circuit extending by way of ground at contacts 441, 431 and the winding of the relay 460 to battery. At contacts 432, relay 430 prepares a circuit for the trunk transfer relay 440 in series with itself. At contacts 436, relay 430 prepares a circuit for the connect relay 590. At contacts 433, relay 430 prepares a circuit for the switch through relay 470. At contacts 434, relay 430 completes a circuit to the "T" relay 740, this circuit extends by way of the grounded conductor 53, contacts 445, 434, 412, conductor 70, cable 850, conductor 70 and through the winding of relay 740 to battery. At contacts 435, relay 430 prepares a circuit to any one of the counting relays preselected by the trunk selecting equipment.

In operating contacts 461, register release relay 460 prevents trunk hunting at the present time. At contacts 462, relay 460 removes ground potential from the circuit to the register relays, thereby allowing counting control relay 620 and counting relay 840 to restore.

In operating contacts 741, relay 740 maintains the register release relay 460 operated, so that the subsequent release of the relay 440 will not cause relay 460 to restore. At contacts 742 to 755, relay 740 prepares for extending the calling line to a trunk. At its contacts 756, the relay 740 prepares an operative circuit for the first digit transfer relay 420 in series with itself. At its contacts 757, the relay 740 prepares a circuit for the relay 330.

In restoring, the counting relay 840 opens contacts 844, which opens the operating circuit to the one digit trunk relay 430. Relay 430 remains operated in series with the now operated trunk transfer relay 440, this circuit extending by way of the grounded conductor 53, winding of relay 440, contacts 432 and the winding of relay 430 to battery. At contacts 890, relay 840 completes a circuit to the connect relay 590, this circuit extending from ground at contacts 373, conductor 48, conductor 48', contacts 890, conductor 680, contacts 693, 692, 691, 690, conductor 485, contacts 436, conductor 78, the winding of relay 590 and the chain circuit of the other connect relays back to battery. This relay 590 now locks itself operated through its "X" contacts 593 to battery.

In operating contacts 441, trunk transfer relay 440 removes the ground potential from the register release relay 460, but this latter relay remains operated due to the aforementioned circuit over contacts 741. At contacts 443, relay 440 completes a circuit for the switch through relay 470, which extends by way of the grounded conductor 53, contacts 443, 433 and the winding of the relay 470 to battery. At contacts 445, relay 440 removes the ground potential from the circuit to the "T" relay 740, but relay 740 is maintained operated over the previously mentioned series circuit which now operates first digit transfer relay 420, this circuit extending by way of the grounded conductor 53, winding of relay 420, conductor 64, contacts 756 and the winding of relay 740 to battery. At contacts 446, relay 440 further opens the original operating circuit of relay 430. At contacts 447, relay 440 prepares an operating circuit to any one of the counting relays preselected by the trunk selecting equipment for the "0" digit trunks. At contacts 448, relay 440 opens the pulsing circuit to the counting relays. At contacts 449, relay 440 maintains a circuit for the register relays during the time that register release relay 460 is operated.

In operating contacts 471 to 475, switch through relay 470 further prepares for extending the trunk call. At contacts 477, relay 470 opens the circuit to relay 400, but as this relay is slow to restore, the subsequent operations will take place before this occurs. At contacts 478, relay 470 further opens the pulsing circuit to the counting relays.

In operating contacts 421, first digit transfer relay 420 opens the circuit to the register release relay 460, allowing it to restore. At contacts 422, relay 420 removes dial tone from the calling line.

In restoring contacts 461, register release relay 460 completes the circuit to one of the counting relays as preselected by the operated trunk selecting relay for the "0" digit trunk group, this circuit extending by way of grounded conductor 53, contacts 601, 611, 621, conductor 71, contacts 461, 447, 435, conductor 79 and contacts 594 to the common marking conductor (corresponding to conductor 526 of Figure 5) of the trunk selecting relay group associated with the "0" digit trunk group, over contacts of the operated trunk selecting relay, corresponding to the preselected trunk in this "0" digit trunk group, (for example, contacts corresponding to contacts 501 if the first trunk is preselected) over conductor 573, conductor 74 and through the winding of relay 630 to battery.

For convenience, instead of showing a duplicate trunk selecting relay group, it will be assumed that the illustrated trunk selecting relay group, shown in detail in Figure 5, is connected to the conductors terminating at the contacts of the single digit connect relay 590 and is to be used for preselecting of trunks in the "0" digit trunk group instead of the "20" digit trunk group, as shown.

The trunk circuits in the "0" digit trunk group (not shown) are identical to the trunk circuit T. C., illustrated in Figure 5. There are four trunks in the "0" digit trunk group accessible through contacts of "T" relay 740 and each such trunk circuit has a trunk busy relay, corresponding to relays 550, 565 and 570, which control the trunk selecting relays in the "0" digit trunk selecting relay group in the same manner as previously described for the "20" digit trunk selecting relay group.

The operation of the trunk selecting relays, trunk busy relays and the trunk circuit for a single digit trunk call is identical to that as previously described in the two digit call, therefore a second description is believed unnecessary.

In operating contacts 631 to 634, counting relay 630 further prepares for the extension of the trunk call and selects the trunk over which the call will be extended. In this instance, following the conductors 39 through 42 to the operated contacts 742 to 745 of the "T" relay 740, it is found that the trunk T-31 will be used. At contacts 690, relay 630 opens the previously traced circuit to the connect relay 590, which restores. At contacts 635, relay 630 completes a circuit to the relay 330, this circuit extending from the grounded conductor 53, contacts 443, 453, conductor 67, contacts 757, conductor 81, cable 850, conductor 81, contacts 635, conductor 54 and the winding of relay 330 to battery. At contacts 636, relay 630 prepares a circuit for the register release relay 460. At contacts 638, relay 630 prepares an operating circuit for the counting control relay 620 in series with itself.

In restoring, connect relay 590 opens the previously traced circuit to the counting relay 630, which remains operated in series with the counting control relay 620.

In operating contacts 331 and 333, relay 330 places a bridge across the talking conductors and removes talking battery from the line conductors. At contacts 335, relay 330 completes an obvious circuit to the slow-to-operate ring cut-off relay 360.

The slow-to-release relay 400 restores and at contacts 401 through 403, prepares for the extension of the calling line. At contacts 406, relay 400 completes a circuit to the register release relay 460, this circuit extending by way of ground at contacts 406, contacts 444, conductor 68, contacts 636, conductor 69 and through the winding of the relay 460. The operation of the register release relay 460 is without affect at this time other than to remove ground from conductor 79 at contacts 461.

The ring cut-off relay 360 has now operated, and completes the extension of the trunk call at contacts 362 and 364. At contacts 365, relay 360 completes its own locking circuit.

When conversation has been terminated, the calling party replaces his receiver, thus opening the loop over the subscribers' line, and restoring the line relay 310, which opens contacts 315 and allows the hold relay 320 to restore. The operated line equipment of the linefinder is allowed to restore by the restoring of these two relays and the ground potential is removed from the grounded conductor 53 by contacts 325 of the hold relay 320. The removal of this ground potential allows the ring cut-off relay 360, the first digit transfer relay 420 and the "T" relay 740, the trunk transfer relay 440 and the one digit trunking relay 430, the switch through relay 470 and the register relays 620 and 630 all to restore. The restoring of these relays allow the register release relay 460, the relay 330, the relay such as 535 and the trunk busy relay such as 550 to restore.

The equipment is now at rest and conditioned to handle future calls.

*Restricted service*

Fourth conductors such as 16 and 17 have been provided for stations A and D to indicate that these stations are equipped for restricted service.

The restricted service in this case, indicating that the selected stations (such as A and D) are provided with only one type of trunking service, namely, they are able to make two digit trunk calls, but are prevented from making single digit trunk calls.

Assuming for instance, that station A has dialed the single digit "0," the extension of its call will be prevented as described in the following explanation.

As the calling line L-11 of station A is extended through to the seized connector, a circuit is completed for the restricted service relay 410. This circuit extending by way of grounded conductor 16, contacts 204, 224, 247, conductor 33 and through the winding of relay 410 to battery. In operating contacts 411, relay 410 prepares a circuit to the busy relay 370. At contacts 412 the circuit for energizing the "T" relay 740 for single or "0" digit trunking is maintained open.

The digit "0" has now been dialed and the operation of the equipment is the same as that explained in the one digit trunk call up to and including the energizing and operating of the one digit trunking relay 430 with the exception, that in the closing of contacts 434, a circuit is now completed to the busy relay 370 instead of the "T" relay 740. This circuit extending from grounded conductor 53, contacts 445, 434, 411, conductor 49 and the winding of relay 370 to battery.

In operating, relay 370 opens contacts 371 and 372, thereby preventing an extension of the calling line. At contacts 376, relay 370 completes a circuit for the transmission of busy tone to the calling station, via a well-known manner. The busy tone continues until the calling party hangs up and allows the equipment to restore; as the call can not be completed.

However, stations having the restricted service arrangement are allowed to make all local calls, two digit trunk calls, and may answer an incoming call on any trunk group.

*Incoming trunk calls*

The following description concerns an incoming trunk call and the manner in which the exchange operates to complete the call.

The operation of the trunking equipment for an incoming trunk call on any of the trunks will be the same. It will, therefore, be assumed that the incoming trunk call is on the trunk circuit T. C. or trunk number T-21 (Figure 5).

On an incoming call a "splash" of ringing current is sent from the distant exchange in a well-known manner and will cause the ring-up relay 555 to momentarily operate over the incoming conductors and contacts 539. Relay 555, at contacts 556 will complete an obvious circuit to the indication relay 560.

In operating contacts 561, relay 560 completes an obvious circuit to the trunk busy relay 550. At contacts 562, relay 560 completes its own locking circuit. At contacts 563, relay 560 completes a parallel energizing circuit for lighting an indicating lamp and to cause a bell or buzzer to transmit an audible signal. The lamp will indicate the trunk number of the incoming call. Both signal indicators are individual to each trunk and may be conveniently located in a large office or switchboard. During this discussion it will be assumed that the signal indicators are located in the office.

In operating contacts 552, trunk busy relay 550 will complete a circuit to the trunk selecting relay 505 causing it to operate, if the second trunk in the "20" trunk group is idle, or to cause the operation of a succeeding trunk selecting relay in case the second trunk is busy. In case the second trunk is idle, relay 505 is operated from ground at contacts 504, contacts 577, 552, 549, 566 and the winding of relay 505 to battery. In case the second trunk is busy, then the next succeeding trunk selecting relay corresponding to the next idle trunk will be energized from ground by way of contacts 504, contacts 577, 552, 549, 567, 559, 571 and winding of relay 510 to battery, assuming that the trunk corresponding to trunk selecting relay 510, is the next idle trunk. The operation of the trunk selecting relay 505, corresponding to the second trunk, marks the second units marking conductor at contacts 506 so that this second trunk is preselected for the next outgoing trunk call in the "20" group. At contacts 507, relay 505 opens the locking circuit of relay 500 to cause relay 500 to restore and remove the marking at contacts 501 for the first units marking conductor so that the first trunk, or trunk T-21, is no longer preselected for use for an outgoing trunk call. At contacts 508, relay 505 completes its own locking circuit to ground at contacts 517 and at contacts 509 completes another locking circuit for itself under control of relay 565 as well as preparing a circuit for energizing the next trunk selecting relay when the second trunk becomes busy on either an incoming or outgoing trunk call.

Any local subscriber may answer the incoming trunk call by removing his receiver and dialing the individual trunk number 21. The digits 2 and 1 are dialed and the equipment operates in the same manner as described for local to local calls. The operations may be briefly described as follows: in response to the removal of the receiver at the subscriber substation desiring to answer the incoming trunk call, finder relays are operated as previously described to connect the answering local subscriber's line to the associated connector. In response to dialing the tens digit 2, the connector counting relays cause the operation of "T" relay 720. Relay 720 closes its contacts to prepare circuit to all lines in the 20 group and to operate the register release relay 460 to release the counting relays. After release of the counting relays, the first digit transfer relay 420 is operated and register release relay 460 is restored. In response to dialing the units digit 1, the connector counting relay 630 is operated to connect the connector in use to trunk number 21 over contacts 631, 632, 633 and 634 and over contacts 722, 723, 724 and 725 of "T" relay 720. Switch-through relay 470 energizes after the transmission of the units digit to open the circuit to relay 400 and to extend the talking and control conductors of the connector to the operated contacts of the operated counting relay. Shortly after the operation of relay 470, relay 400 restores to close the talking conductors at contacts 401 and 402 and to close a circuit from ground at contacts 373 for operating the control relay 535 in trunk number T-21. This circuit may be traced as follows: from ground at contacts 373 over contacts 403, 474, 473, 633 and 724, the C conductor of trunk T-21, contacts 524 and the winding of relay 535 to battery. At contacts 536, relay 535 closes a multiple ground for holding trunk busy relay 550 operated, at contacts 537 opens the locking circuit of relay 560, thereby causing relay 560 to restore, and at contacts 539 opens the operating circuit to the ring-up relay 555. Relay 560 restores and at contacts 561 opens the original energizing circuit of relay 550 but relay 550 is now held operated from contacts 536. At contacts 562, relay 560 opens a point in its own locking circuit and at contacts 563 opens the circuit to both the visual and audible trunk signals 529 and 574, to erase such signals by extinguishing lamp 529 and stopping the operation of audible signal 574 to indicate that the incoming trunk call has been answered.

As soon as slow-to-release relay 400 restores, a circuit is closed for operating the ring cut-off relay 360 over a bridge (not shown) across the talking conductors in the central office in trunk T-21 as follows: from interrupted generator, contacts 545, over the lower trunk line conductor to the central office, over the bridge (not shown) closed when the trunk call was originated, back over the upper trunk line conductor, contacts 543, positive line conductor of trunk T-21, contacts 723, 632, 472, 402, 372 and 363 to ground. Ring cut-off relay 360 immediately operates over this circuit and at contacts 362 and 364 completes the talking circuit between the local subscriber's line answering this incoming trunk call and the calling central office subscriber's line over the above traced talking conductors. Talking battery is supplied to the local subscriber through the windings of relays 300 and 310 while talking battery for the central office subscriber is supplied from battery and ground at contacts 332 and 334 through the windings of impedance coil 340.

*Trunk holding*

An incoming trunk call may be answered in the manner previously described for an incoming trunk call, the answering party such as A may place the trunk in a "hold" condition and call locally or over another trunk by depressing the non-locking push button such as 9. The answering party may later come back on the "held" trunk, or a second answering party may connect with the "held" trunk by dialing its two digit individual trunk number. Assuming that the incoming trunk call is on the trunk T-32 and that the trunk circuit T. C. in Figure 5 is trunk T-32, instead of trunk T-21, T-32 would not be busy to its pick-up number 32, but would be busy to anyone dialing "0."

The above will be more fully described, in which, the incoming trunk call on trunk T-32 is answered in the same manner as previously described for an incoming trunk call. It may be assumed that the answering local party is not the one whom the calling party desires to talk with.

The answering party may then "hold" the trunk call by depressing the push button, such as 9, at his telephone. This places a momentary ground on the line, unbalancing the windings of the differentially connected relay 300.

In operating contacts 302, differential relay 300 opens the circuit to the hold relay 320 and at contacts 301, applies a ground to the extra control (E. C.) conductor of the trunk circuit. This ground may be traced from ground at contacts 301, conductor 50, contacts 644 (trunk number T-32 has been answered), conductor 95, contacts 749, E. C. conductor, trunk T-32, the E. C. conductor of trunk circuit T. C. and through the winding of relay 520 to battery and thus operate said relay The restoring of relay 320 releases all operated relays of the connector link, by disconnecting ground from the grounded conductor 53, except the differential relay 300 and line relay 310, thereby restoring said connector and disconnecting said connector from the trunk circuit T. C. and allow the connector to handle other calls without requiring the party answering the trunk call to hang up his receiver. The line-finder and line equipment are maintained operated by the line relay 310 by way of contacts 311 and 313.

In operating contacts 521, relay 520 maintains the trunk busy relay 550 operated. At contacts 522, relay 520 provides its own locking circuit in an obvious manner, at contacts 523, relay 520 completes an obvious circuit to relay 540. At contacts 524, relay 520 opens the circuit to the control relay 535, which restores. At contacts 525, relay 520 places a direct holding bridge across the talking conductors of the trunk circuit.

In operating contacts 541, relay 540 applies ground to the multiple circuit of trunk busy relay 550. At contacts 542, relay 540 prepares its own locking circuit and at contacts 544 and 546 opens the talking conductors of the trunk circuit T. C., thereby bridging the relay 530 across the incoming talking conductors and operating said relay.

In operating contacts 531, relay 530 completes a circuit to the lamp 528 which indicates that the incoming call is "held" and the trunk's corresponding number. At contacts 532, relay 530 opens the locking circuit of relay 520 which restores and at contacts 533 completes a prepared obvious locking circuit for relay 540.

The incoming trunk call is now "held" and will remain so until the first party that answered, or a second party, dials the trunk number 32, at which time a ground potential is applied to the C conductor of the trunk circuit T. C. over a previously traced path to operate the control relay 535.

In operating contacts 536, relay 535 maintains the trunk busy relay operated and at contacts 538 opens the locking circuit of relay 540.

In restoring, relay 540 opens contacts 544 and 546, allowing relay 530 to restore and thereby extinguish the "call held" lamp 528. The talking circuit is now completed at contacts 543 and 545.

After conversation and in response to the replacement of the receiver by the local party, the linefinder and connector release as previously described to disconnect from trunk T-32 and the central office equipment is released when the central office subscriber replaces his receiver.

Outgoing trunk calls from the local exchange over trunk circuits, such as T. C., may also be held in a similar manner.

The central office subscriber can release a "held" trunk in case, for some reason, the local subscriber either forgets to come back on the "held" trunk or fails to do so, for other reasons. Under these conditions, after the central office subscriber has waited a reasonable time, such subscriber may release the held trunk by replacing his receiver to thereby open the circuit to relay 530, which will release to extinguish lamp 528 at contacts 531. At contacts 533, relay 530 opens the locking circuit of relay 540. Upon releasing, relay 540 at contacts 541, opens the circuit to trunk busy relay 550. Relay 550, upon releasing at contacts such as 551, prepares the circuit for trunk selecting relay such as relay 500 so that it may be energized at the proper time to preselect this trunk for use on outgoing calls.

Having described the invention, what is considered new and desired to have protected by Letters Patent will be pointed out in the appended claims.

What is claimed is:

1. In an all-relay telephone system, a plurality of subscriber lines, a group of trunks having a designated common single-digit group call number and each trunk having a designated different individual two-digit trunk call number, an all-relay connector comprising tens relays and counting relays, means responsive to a calling one of said subscriber lines initiating a call for connecting said calling line to said connector, means responsive to the calling subscriber dialing the tens digit of one of said individual two-digit trunk numbers for operating said counting relays in accordance with the dialed tens digit, means for operating the particular tens relay corresponding to the dialed tens digit in response to the operation of the last operated one of said counting relays, said second means responsive to said calling line dialing the units digit of said one individual two-digit trunk number for operating the counting relay corresponding to the dialed units digit, contacts on said operated tens and the last operated one of said counting relays for completing a connection from said calling line to the trunk corresponding to said one dialed individual two-digit trunk number, circuit means for preselecting an idle trunk in said group, other circuit means for selecting one of said counting relays corresponding to said preselected idle trunk, means responsive to said calling line dialing the designated common single-digit group call number for operating said counting relays to operate said particular tens relay, for releasing said operated counting relays, and for thereafter operating said selected one of said counting relays corresponding to said preselected idle trunk, and contacts on said particular operated tens relay and contacts on said operated selected one of said counting relays for completing a connection from said calling line to said preselected idle trunk.

2. In an all-relay telephone system, a plurality of subscriber lines, a trunk, a finder-connector link, tens and units relays in the finder portion of said link, group and line connecting relays in the connector portion of said link, means responsive to the initiation of a call by a calling one of said lines for operating one of said tens relays and one of said units relays to complete a connection from said calling line to said link, means controlled by said calling line for operating one of said group and one of said line connecting relays to extend said connection through said link to complete a connection between said calling line and said trunk, circuit means controlled by said calling subscriber for establishing a holding condition on said trunk, first relay means included in said connector portion of said link and operated responsive to the establishing of said holding condition for releasing said operated group and line connecting relays to release the connector portion of said link and disconnect said calling line from said trunk, other relay means operated responsive to said operation of said first relay means for holding said tens and units relays in said finder portion operated to maintain the connection between said calling line and said link through said operated tens and units relays in said finder portion of said link.

3. In a telephone system, a plurality of local subscriber lines, a finder-connector link, means responsive to the initiation of a call by a calling one of said subscriber lines for operating the finder portion of said link to complete a connection between said calling subscriber line and said link, line and release relays in the connector portion of said link operated in response to said connection, group and line connecting relays in the connector portion of said link, means for operating said line relay to operate certain ones of said group and line connecting relays to complete a connection to a corresponding called one of said subscriber lines, a holding circuit controlled by said release relay for maintaining operated the operated ones of said group and line connecting relays to maintain the connection between said calling and called subscriber lines, circuit means included in the connector portion of said link controlled over said calling subscriber line for releasing said release relay to open said holding circuit to thereby disconnect said calling and called subscriber lines by releasing the operated group and line connecting relays and the connector portion of said link while maintaining said line relay operated, and circuit means controlled by said line relay for maintaining the finder portion of said link and the connection between said calling subscriber line and said link.

4. In a telephone system, a plurality of local subscriber lines, a finder-connector link, tens and units relays in the finder portion of said link operated responsive to the initiation of a call by a calling one of said subscriber lines for completing a connection from said calling subscriber line to said link, line and release relays in the connector portion of said link operated in response to said connection, group and line connecting relays in said connector portion of said link, means controlled over said calling subscriber line for operating said line relay to operate said group and line connecting relays to complete a connection to a called one of said subscriber lines, a connector holding circuit controlled by said release relay for maintaining operated the operated ones of said group and line connecting relays to maintain the connection between said calling subscriber line and said called subscriber line, circuit means included in the connector portion of said link controlled over said calling subscriber line for releasing said release relay to thereby open said connector holding circuit to release the operated group and line connecting relays and the connector portion of said link while maintaining said line relay operated, and circuit means controlled by said line relay for maintaining the finder portion of said link and the connection between said calling subscriber line and link.

5. In an all-relay automatic telephone system, a plurality of subscriber lines, a plurality of trunks each having a designated individual two-digit trunk number, said plurality of trunks being divided into two groups, said first trunk group having a common designated single digit group number and said second trunk group having a common designated two-digit group number, visual indicating means individual to each trunk, means for operating said visual indicating means in response to the receipt of an incoming call on one of said trunks for visually indicating said calling trunks' individual two-digit trunk number, connecting means, means operated responsive to the calling of said visually indicated trunk number by any one of said subscribers for operating said connecting means to connect the one subscriber line with said corresponding trunk, circuit means for preventing the extension of a trunk call between calling ones of only certain of said subscribers lines and trunks of only said first trunk group, means whereby said circuit means is rendered effective in response to the calling of said common single digit trunk group number of said first trunk group by any one of said certain calling subscribers, means for extending a trunk call over said second trunk group, and means for operating said last means in response to the calling of said common two-digit trunk group number by any of said subscriber lines.

6. In an all-relay automatic telephone system, a plurality of subscriber lines, a plurality of trunks each having a designated individual trunk number, visual indicating means individual to each trunk, means for operating said visual indicating means in response to the receipt of an incoming call on one of said trunks for visually indicating said calling trunk's individual number, a plurality of finder-connector links, means operated by one of said subscribers for seizing one of said finder-connector links, connecting means in each of said finder-connector links, means included in said seized link and operated responsive to the calling of said visually indicated trunk number by said one subscriber for operating the connecting means in said seized link to connect said one subscriber line with the corresponding trunk, a push button at each subscriber's station, circuit means included in each of said connector portions of said links and controlled by said push buttons, means operated by the completion of said circuit means responsive to said one subscriber operating said push button for establishing a holding condition on said calling trunk to make said trunk available to any one of said subscribers, other circuit means included in each of said finder-connector links controlled by a holding condition when established, and means operated by the completion of said other circuit means responsive to said holding condition being established by said one subscriber for releasing only the connector portion of said seized link, thereby enabling said one subscriber to initiate other calls without first releasing the finder portion of said previously seized finder-connector link.

7. In an all-relay automatic telephone system, a plurality of subscriber lines, a plurality of trunks each having a designated different individual trunk number, said plurality of trunks having a group call number common thereto and being different than said individual trunk numbers, first relay connecting means controlled over any one of said subscriber lines responsive to the calling of said common group call number for establishing an outgoing trunk call over a first idle one of said trunks, other relay connecting means controlled over any one of said subscriber lines responsive to the calling of a particular one of said individual trunk call numbers for answering a trunk call incoming over the one of said trunks corresponding to said called individual trunk call number, busying means individual to each of said trunks, additional relay means operated in response to receipt of an incoming trunk call on one of said trunks for operating said busying means individual to said one trunk, means whereby said operation of said busying means is effective to prevent the operation of said first relay connecting means in case any one of said subscribers calls said common group number, while permitting the operation of said other relay connecting means in case any one of said subscribers calls said one individual trunk call number.

8. In an all-relay telephone system, a plurality of subscriber lines, a plurality of trunks each having a designated different individual two-digit trunk call number, said plurality of trunks divided into two trunk groups, the first of said trunk groups having a designated common single-digit group call number and the second of said groups having a designated common two-digit group call number, an all-relay connector having a group relay individual to each said trunk group, a plurality of line connecting relays in said connector each being common to a corresponding trunk in each trunk group, circuit means for preselecting an idle trunk in each trunk group, means including a first one of said group relays and one of said line connecting relays corresponding to the trunk in said single-digit group preselected by said circuit means for connecting a calling one of said subscriber lines with the idle preselected one of said trunks in said first trunk group in response to the calling subscriber dialling said designated common single-digit group call number, means including the other of said group relays and one of said line connecting relays corresponding to the trunk in said two-digit group preselected by said circuit means for connecting said calling line with an idle preselected one of said trunks in said second trunk group in case said calling subscriber dials the two digits of said designated common two-digit group call number, first relay means for connecting said calling line with a particular one of said trunks in said first trunk group in case said calling line dials the two digits of the designated individual two-digit trunk call number assigned to said particular one trunk in said single-digit trunk group, said first relay means including said first one of said group relays and the line connecting relay corresponding to the second dialled digit in the individual two-digit trunk call number, and second relay means for connecting said calling line with a particular one of said trunks in said second trunk group in case said calling line dials the two digits of the designated individual two-digit trunk call number assigned to said particular one trunk in said two-digit trunk group, said second relay means including said other group relay and a line connecting relay corresponding to a second dialled digit in the individual two-digit trunk call number.

9. In an all-relay telephone system such as claimed in claim 8 in which certain of said subscriber lines have restricted service connections individual thereto, and circuit means including a relay in said connector operated over said restricted service connections, in response to any one of said certain subscriber lines initiating a call, for preventing the completion of a connection between a calling one of said certain subscribers and one of the trunks in said first trunk group only when such certain subscriber line dials the designated common single-digit group call number of said first trunk group.

10. In an all-relay telephone system such as claimed in claim 8 in which certain of said subscriber lines have restricted service means in said connector operated only when said certain subscriber lines initiate calls, for preventing connections between said certain subscriber lines and idle ones of the trunk lines in said first trunk group.

11. In an all-relay telephone system, a plurality of subscriber lines, a group of trunks having a designated common single-digit group call number and each trunk having a designated different individual two-digit trunk call number, an all-relay connector including a group relay individual to said group of trunks and a plurality of line connecting relays each being individual to a different trunk in said group, means for connecting a calling line to said connector, means responsive to the calling subscriber dialling the two digits of the designated individual two-digit trunk call number of one of said trunks for operating said group relay and the line connecting relay designated by said two-digits in said dialled individual two-digit trunk call number, means controlled responsive to said operation of said group relay and said designated connecting relay for completing a connection from said calling line to said one trunk, circuit means for preselecting an idle trunk in said group, other circuit means for selecting one of said connecting relays corresponding to said idle trunk, additional circuit means responsive to the calling subscriber dialling the designated single-digit group call number for operating the same group relay and the selected one of said line connecting relays designated by said single-digit in said dialled common single-digit call number, and means controlled responsive to said operation of said same group relay and said selected one connecting relay for completing a connection from said calling line to said one idle trunk.

12. In a telephone system such as claimed in claim 11 wherein said first circuit means includes a group of trunk selecting relays having a relay for each of said trunks, a chain circuit interconnecting said trunk selecting relays for energizing said relays in rotation, means including said chain circuit for energizing only one of said trunk selecting relays at a time to preselect only one idle one of said trunks, and circuits controlled by the one energized trunk selecting relay for preselecting the corresponding one of said line connecting relays for use.

13. In an all-relay telephone system, a plurality of subscriber lines, a group of trunks having a designated common two-digit group call number and each trunk having a different designated individual two-digit trunk call number, each individual two-digit trunk call number having units digits differing from the units digits of said common group call number, an all-relay connector including a group relay individual to said trunk group and a plurality of line connecting relays each being individual to a different one of said trunks in said trunk group, means for connecting a calling line with said connector, means responsive to the calling subscriber dialling the two digits of the designated individual two-digit trunk call number of one of said trunks for operating said group relay and the line connecting relay designated by the tens and units digits of said dialled individual two-digit trunk call number, means controlled responsive to said operation of said group relay and said designated connecting relay for completing a connection from said calling line to said one trunk, trunk selecting means for preselecting idle trunks and for selecting one of said line connecting relays corresponding to said preselected idle trunk, means responsive to the calling subscriber dialling the designated common two-digit group call number for operating the same group relay and the selected one of said line connecting relays corresponding to an idle one of said trunks, and means controlled responsive to said operation of said same group relay and said selected one line connecting relay for completing a connection from said calling line to said one idle trunk.

14. In a telephone system such as claimed in claim 13 wherein said trunk selecting means includes a group of trunk selecting relays having a relay individual to each of said trunks, means for controlling the operation of said trunk selecting relays dependent upon the idle or busy condition of said trunks and for energizing only one of said trunk selecting relays at a time to preselect the next idle one of said trunks, and contacts controlled by the energized trunk selecting relay for preselecting the one of said line connecting relays corresponding to said preselected trunk.

15. In an all-relay telephone system, a plurality of local subscriber lines, a finder-connector link, tens and units relays in the finder portion of said link operated responsive to the initiation of a call by one of said subscriber lines for connecting said calling subscriber line to said link, group and line connecting relays in the connector portion of said link operated responsive to incoming pulses transmitted from said calling subscriber line, means controlled responsive to said operation of said group and line connecting relays for further extending said connection through said link to thereby complete a connection between said calling one of said subscriber lines and a called subscriber line, circuit means included in said connector portion of said link and completed by said calling subscriber line after said called subscriber has hung up to sever said connection for releasing said operated group and line connecting relays to restore the connector portion of said link, and relay means included in said connector portion of said link and operated by said circuit means for maintaining said tens and units relays operated to thereby maintain the finder portion of said link and the connection between said calling subscriber line and said link.

16. In a telephone system, a group of trunks for establishing outgoing and incoming trunk calls, a busy relay individual to each trunk operated in response to the establishment of either an outgoing or an incoming trunk call over the corresponding trunk, a group of trunk selecting relays including a trunk selecting relay individual to each trunk, circuit means under control of said busy relays for operating only one of said trunk selecting relays at a time, means controlled by said operated trunk selecting relays for preselecting an idle one of said trunks for use on outgoing trunk calls, a set of terminals individual to each of said trunks, connecting means, circuit means for operating said connecting means, means controlled by said connecting means when operated for seizing the set of terminals individual to said preselected idle one of said trunks, thereby establishing an outgoing trunk call over the preselected idle one of said trunks, and other means controlled by said connecting means when operated for seizing the same set of terminals, thereby answering an incoming trunk call over said one trunk by seizing said same set of terminals irrespective of the operated condition of the corresponding individual busy relay and the corresponding individual trunk selecting relay.

JOHN H. VOSS.

REFERENCES CITED

The following references are of record in the file of this patent:

UNITED STATES PATENTS

| Number | Name | Date |
|---|---|---|
| 1,886,613 | Wicks | Nov. 8, 1932 |
| 2,241,158 | Powell | May 6, 1941 |
| 2,258,651 | Hovland | Oct. 14, 1941 |
| 2,310,481 | Wallace | Feb. 9, 1943 |
| 2,370,335 | Wallace | Feb. 27, 1945 |
| 2,422,565 | Powell | June 17, 1947 |